July 10, 1956  M. E. FRY  2,754,403
DOMESTIC APPLIANCE
Filed March 26, 1953
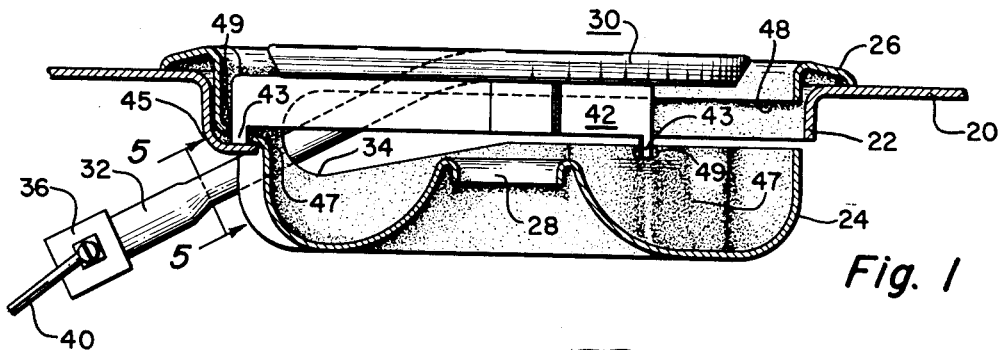
Fig. 1
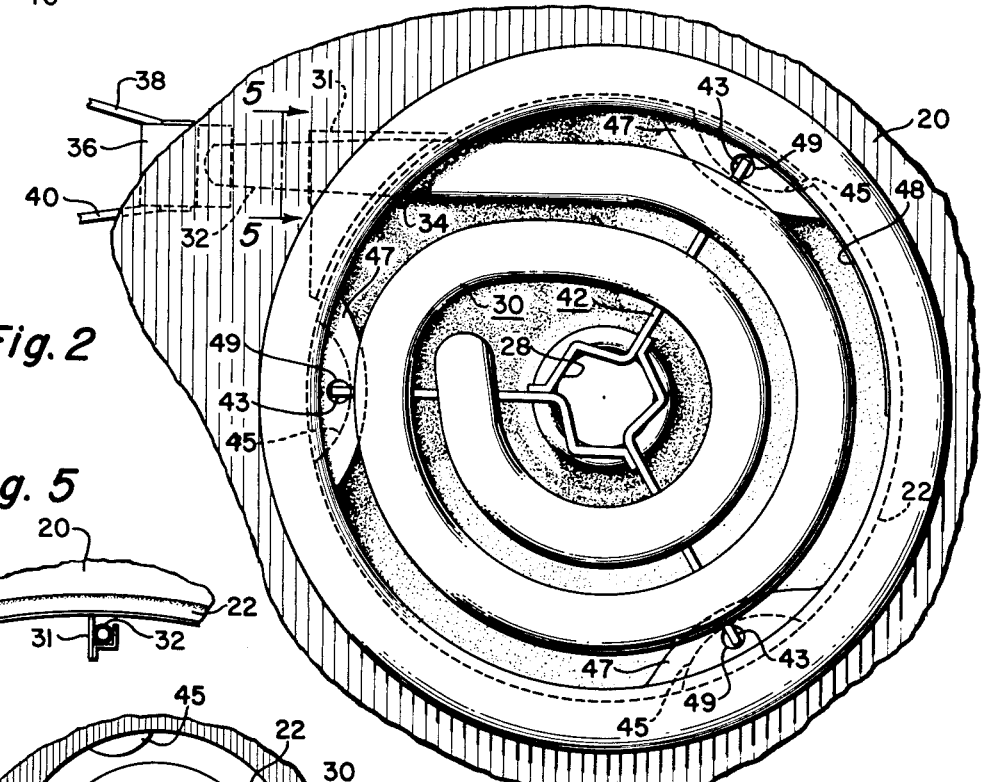
Fig. 2
Fig. 5
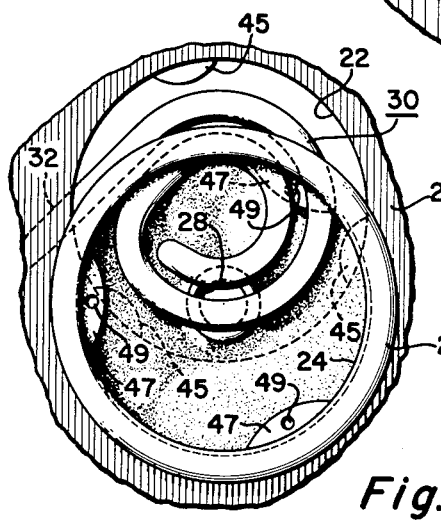
Fig. 3
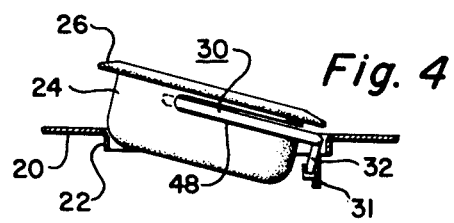
Fig. 4
INVENTOR.
Millard E. Fry
BY R R Candor
His Attorney

United States Patent Office 2,754,403
Patented July 10, 1956

2,754,403
DOMESTIC APPLIANCE

Millard E. Fry, Dayton, Ohio, assignor to General Motors Corporation, Detroit, Mich., a corporation of Delaware Application March 26, 1953, Serial No. 344,867

8 Claims. (Cl. 219—37)

This invention relates to a domestic appliance and more particularly to a surface heating arrangement for the range top of an electric range.

In present surface heating arrangements it is customary to provide an ornamental flanged trim ring fitting into the aperture of the range top. Such a trim ring is used to support the heating unit as well as the drip pan. This construction is somewhat costly and the trim ring ordinarily cannot be readily removed from the range for cleaning.

It is an object of my invention to eliminate the trim ring and to individually support the drip pan as well as the heating unit from the range top.

It is another object of my invention to provide an arrangement in which a very thin drip pan may be used having within it a heating unit which does not have its weight supported by the drip pan.

It is another object of my invention to provide a drip pan which is supported by having its rim overlapping the edge of the surface heater aperture in the range top and to provide a heating unit within the range top which is supported from the range top without imposing any material stress upon the drip pan.

It is another object of my invention to provide such a drip pan and support arrangement with a simple easy method and arrangement for removing the drip pan as well as the heater support.

These and other objects are attained in the form shown by providing a drip pan having a continuous rim large enough in diameter to rest upon the edges of the surface heating unit aperture in the top of a range. The heating unit is located within the drip pan and has a terminal portion extending through an elongated aperture in the drip pan to a hinge connection with the range top. The heating unit preferably has a separate three-armed support provided with downwardly extending projections at the ends of the arms which extend through apertures in the drip pan into supporting contact with projecting ledges extending from the range top beneath the drip pan.

Further objects and advantages of the present invention will be apparent from the following description, reference being had to the accompanying drawings wherein a preferred form of the invention is clearly shown.

In the drawing:

Figure 1 is a vertical sectional view through a surface heating arrangement embodying one form of my invention;

Figure 2 is a top view of the arrangement shown in Figure 1;

Figure 3 is a smaller top view showing the removal of the drip pan from the range top aperture and the surface heating unit;

Figure 4 is a smaller elevational view with the range top in section showing the removal of the drip pan from the surface heating unit; and Figure 5 is a fragmentary sectional view taken on the line 5—5 of Figures 1 and 2.

Referring now to the drawing there is shown a portion 20 of the top of a domestic electric range provided with a flanged surface heating unit aperture 22. Within this aperture is a drip pan 24 somewhat in the shape of a bowl having a continuous rim 26 which is considerably larger in diameter than the aperture 22 so that its outer edge rests upon the bordering portions of the range top 20 as shown in Figure 1. The drip pan 24 may have a raised central portion provided with an overflow aperture 28.

The surface heating unit 30 is of the tubular sheath type in which the sheath is somewhat triangle-shaped in cross-section. This sheathed heater is formed into a shape somewhat similar to a flat spiral as shown in Figure 2. The heater 30 has a terminal portion 32 extending tangentially from the spiral portion and downwardly at an angle of about 30° from the plane of the spiral.

The side wall of the drip pan 24 below the rim 26 is provided with a large aperture 34 through which extends the terminal portion 32. The terminal portion 32 terminates in a terminal block 36 beneath the range top 20. Attached to the sides of this terminal block are the electrical conductors 38 and 40 which are preferably quite flexible so that the surface heating unit 30 can be moved or rotated a limited distance. The range top 20 is provided with a hinge or bearing 31 best shown in Figures 4 and 5 which holds the terminal portion 32 so as to prevent the removal of the heater but permits its rotation as shown in Figure 4. Separate from the heating unit 30 and the drip pan 24 is a three-armed support 42 upon which rests the surface heating unit 30. This support 42 is made of three strips of stainless steel having downwardly extending projections 43 at the ends of each of the arms as shown best in Figure 1.

According to the present invention, the range top 20 is provided with three projecting ledges 45 located 120° apart. These projecting ledges 45 are continuations of the flange of the aperture 22 in the shape of ears bent 90° to project horizontally into the surface heating unit aperture beneath the drip pan 24 as shown in Figure 1. To receive these projecting ledges 45, the drip pan 24 is provided with three recesses 47 also arranged 120° apart. Each of these recesses 47 is provided with an aperture 49 located over the adjacent projecting ledge 45 through which extends the adjacent projection 43 of the heater support 42. These projections 43 extend into supporting relationship with the projecting ledge 45 by resting directly upon the ledge 45. In this way the entire weight and support of the surface heating unit 30 and the weight of anything resting upon the surface heating unit 30 is carried directly by the range top 20 through the support 42 without imposing any stress or strain upon the drip pan 24. Therefore the drip pan 24 may be made of very thin material such as aluminum or it may be of porcelain coated steel.

To make it possible to readily remove the drip pan 24 and the support 42 from the range for cleaning or other purposes, the aperture 34 is elongated to extend beneath the rim 26 and parallel to the rim 26 through an arc between 120° and 180° as indicated by the reference character 48. This aperture 34 with its elongation 48 is sufficiently large so that the surface heating unit 30 may pass through this elongated aperture when the drip pan is removed as shown in Figures 3 and 4 by pivoting the surface heating unit 30 on its hinge 31. The heater support 42 may be withdrawn by pivoting the heater 30 upwardly prior to the removal of the drip pan. In this way the support and the drip pan may be taken to any suitable place for cleaning without difficulty. These parts can be just as easily reassembled to their proper positions. The surface heating unit 30 can be pivoted on its hinge or bearing 31 partially out of the aperture 22 for cleaning. All of the parts can be economically manufactured. Their design permits a wide selection of materials and surface finishes.

In accordance with the provisions of Rule 78a, reference is made to the following prior filed application, S. N. 171,096, filed June 29, 1950, now Patent Number 2,719,906.

While the form of embodiment of the invention as herein disclosed constitutes a preferred form, it is to be understood that other forms might be adopted as may com within the scope of the claims which follow.

What is claimed is as follows:

1. In combination, a range top having a surface heating unit aperture therein, a removable drip pan constituting an element separate from said top supported directly by and in direct contact with said range top within said aperture, said range top having integral support means adjacent said aperture and said drip pan, a heating unit within said drip pan, said heating unit having direct positive supporting means extending into direct positive supporting relationship with the support means of said range top.

2. In combination, a range top having a surface heating unit aperture therein, a removable drip pan constituting an element separate from said top supported within said aperture said range top having support means adjacent said aperature and said drip pan, a heating unit within said drip pan, said drip pan having a plurality of apertures adjacent said support means, said heating unit having support means extending through said apertures into supporting relationship with said support means of the range top.

3. In combination, a range top having a surface heating unit aperture therein, a removable drip pan constituting an element separate from said top supported within said aperture, said range top having a plurality of projecting ledges extending into said aperture beneath said drip pan, said drip pan having recessed portions receiving said projecting ledges, a heating unit within said drip pan, said heating unit having supporting means extending into supporting relationship with said projecting ledges.

4. In combination, a range top having a surface heating unit aperture therein, a removable drip pan constituting an element separate from said top supported within said aperture, said range top having a plurality of projecting ledges extending into said aperture beneath said drip pan, said drip pan having recessed portions receiving said projecting ledges, a heating unit within said drip pan, said recessed portions having apertures over said ledges, said heating unit having supporting means extending through said apertures into supporting relationship with said projecting ledges.

5. In combination, a range top having a surface heating unit aperture therein, a removable drip pan constituting an element separate from said top supported within said aperture, said range top having a plurality of projecting ledges extending into said aperture beneath said drip pan, said drip pan having recessed portions receiving said projecting ledges, a heating unit within said drip pan, said recessed portions having apertures over said ledges, said heating unit having supporting arms provided with downwardly extending projections extending through said apertures into supporting relationship with said projecting ledges.

6. In combination, a range top having a surface heating unit aperture therein, a drip pan supported within said aperture, said range top having support means adjacent said aperture and said drip pan, a heating unit within said drip pan, said heating unit having supporting means extending into supporting relationship with the support means of said range top, said drip pan having an elongated aperture sufficient in size to slip over said heating unit to facilitate insertion and removal of the drip pan without disconnection of said heating unit.

7. In combination, a range top having a surface heating unit aperture therein, a drip pan supported within said aperture, said range top having support means adjacent said aperture and said drip pan, a heating unit within said drip pan, said heating unit having supporting means extending into supporting relationship with the support means of said range top, said drip pan having an elongated aperture sufficient in size to slip over said heating unit to facilitate insertion and removal of the drip pan without disconnection of said heating unit, said heating unit having its terminal portion extending through said elongated aperture, and hinge means pivotally connecting said terminal portion and the portion of the range top adjacent said aperture.

8. A surface heating arrangement for the surface unit aperture in the range top of a range including a removable drip pan constituting an element separate from said top having a rim large enough in diameter to rest upon the edges of said surface unit aperture in a range top, a surface heating unit located within said drip pan, said surface heating unit having three supporting arms, said range top having supporting portions, said drip pan being provided with three apertures, said arms and the supporting portions of said range top extending into supporting relationship through said apertures.

References Cited in the file of this patent

UNITED STATES PATENTS

| | | |
|---|---|---|
| 2,418,520 | Morton | Apr. 8, 1947 |
| 2,506,554 | Tuttle | May 2, 1950 |
| 2,615,117 | Tillapaugh | Oct. 21, 1952 |
| 2,632,837 | Andersen | Mar. 24, 1953 |
| 2,633,523 | Gibson | Mar. 31, 1953 |

FOREIGN PATENTS

| | | |
|---|---|---|
| 446,550 | Great Britain | May 1, 1936 |